US008538365B2

(12) United States Patent
Croman et al.

(10) Patent No.: US 8,538,365 B2
(45) Date of Patent: Sep. 17, 2013

(54) PERFORMING POWER CONTROL IN A RECEIVER BASED ON ENVIRONMENTAL NOISE

(75) Inventors: Russell Croman, Austin, TX (US); Christopher S. Gregg, Austin, TX (US); Dan B. Kasha, Seattle, WA (US); Michael R. May, Austin, TX (US); John Khoury, Austin, TX (US); Javier Elenes, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 13/249,508

(22) Filed: Sep. 30, 2011

(65) Prior Publication Data
US 2013/0084818 A1 Apr. 4, 2013

(51) Int. Cl.
*H04B 1/10* (2006.01)
(52) U.S. Cl.
USPC .......................................... 455/310; 455/296
(58) Field of Classification Search
USPC ........... 455/143, 130, 133, 135, 226.3, 277.2, 455/278.1, 310, 296, 522
See application file for complete search history.

(56) References Cited

U.S. PATENT DOCUMENTS

| | | | |
|---|---|---|---|
| 4,761,829 A * | 8/1988 | Lynk et al. | 455/307 |
| 6,487,419 B1 * | 11/2002 | Freed | 455/522 |
| 7,061,993 B2 * | 6/2006 | Wieck | 375/316 |
| 7,483,501 B1 * | 1/2009 | Michaels, Jr. | 375/346 |
| 8,060,041 B2 * | 11/2011 | Ballantyne | 455/133 |
| 8,224,254 B2 * | 7/2012 | Haykin | 455/67.11 |
| 2006/0009177 A1 * | 1/2006 | Persico et al. | 455/143 |
| 2006/0125689 A1 * | 6/2006 | Narayan et al. | 342/381 |
| 2010/0311463 A1 * | 12/2010 | Konchitsky et al. | 455/550.1 |

OTHER PUBLICATIONS

U.S. Appl. No. 12/938,451, filed Nov. 3, 2010, entitled, "Controlling Power Consumption in a Radio Tuner," by Matthew Hensen, et al.

* cited by examiner

*Primary Examiner* — Sonny Trinh
(74) *Attorney, Agent, or Firm* — Trop, Pruner & Hu, P.C.

(57) ABSTRACT

In one embodiment, a method includes receiving and processing an incoming radio frequency (RF) signal in a receiver. Based on this signal, an environmental noise level can be determined, where this level corresponds to environmental noise present in an environment in which the receiver is located. Then, if the environmental noise level is substantially greater than receiver-generated noise, power consumption of at least one analog front end component of the receiver can be reduced.

26 Claims, 8 Drawing Sheets

PERFORMING POWER CONTROL IN A RECEIVER BASED ON ENVIRONMENTAL NOISE

BACKGROUND

Many radio receivers are now being implemented as one or more semiconductor chips. In this way, benefits of smaller radio size, improved processing, reduced power consumption and so forth can be realized. Although a semiconductor-based radio can consume lower power than a conventional analog receiver, in some instances particularly when the semiconductor radio is included in a portable device, power consumption can still be higher than desired.

In general, there are limited opportunities for further reducing power consumption of a semiconductor radio. This is so, as typically to enable a high performance high quality audio output from the radio device, the semiconductor radio operates at a maximum power consumption level. When signal strength of a received signal of an analog modulation in a semiconductor radio is strong, power consumption can be reduced in the receiver under the assumption that there is a sufficient signal-to-noise ratio (SNR) level such that consuming additional power in a front end of the receiver to lower front end noise is not needed. However, the availability for power reduction in this manner is often limited as most typically a receiver does not operate in a high signal environment. That is, most often a receiver will be operating in a low signal environment and thus available power reduction techniques cannot be used.

SUMMARY OF THE INVENTION

According to one aspect, the present invention includes a method for receiving and processing an incoming radio frequency (RF) signal in a receiver. Based on this signal, an environmental noise level can be determined, where this level corresponds to environmental noise present in an environment in which the receiver is located. Then, if the environmental noise level is substantially greater than receiver-generated noise, power consumption of at least one analog front end component of the receiver can be reduced. As one example, the power consumption can be reduced by disabling a parallel stage of a front end component.

Another aspect of the present invention is directed to an apparatus including a receiver with an analog front end having a signal path to receive and downconvert an RF signal. The analog front end may include a low noise amplifier (LNA) with parallel paths to receive and amplify the RF signal, and a mixer with parallel paths to downconvert the RF signal to a second frequency signal. In turn, a demodulator is coupled to the analog front end to receive and demodulate the second frequency signal. And a controller may be configured to control a power consumption level of the receiver based at least in part on an environmental noise level of the receiver's environment. A noise estimator can be coupled to a signal path of the receiver to estimate the environmental noise level based on the RF signal. The controller can reduce the power consumption level of at least one of the LNA and the mixer from a maximum power mode level if the environmental noise level is substantially greater than receiver-generated noise.

Yet another aspect is directed to a system with a receiver that includes an environmental noise detector to estimate an environmental noise level of the receiver's environment based on a first signal metric of a received RF signal. The receiver may further include a table to store characterization data including a receiver-generated noise level associated with different power levels of the receiver. In turn, a power controller can control a power consumption level of the receiver based on the environmental noise level and the receiver-generated noise level. The power controller can control the receiver to operate at a first power consumption level in a laboratory environment and at a lower power consumption level in a non-laboratory environment, e.g., due to the presence of environmental noise in the non-laboratory environment.

A still further aspect is directed to an article in the form of a non-transitory storage medium including instructions to receive and process a communication signal, determine a signal quality metric based on the communication signal, and if the signal quality metric is greater than a threshold signal quality level, reduce power consumption of one or more analog front end components of a system. Note that this communication signal can be of a digital modulation scheme. The instructions may further be used to determine an environmental noise level corresponding to environmental noise present in an environment in which the system is located, and if the environmental noise level is substantially greater than receiver-generated noise, reduce power consumption of an analog front end component.

DETAILED DESCRIPTION

Figure 1:
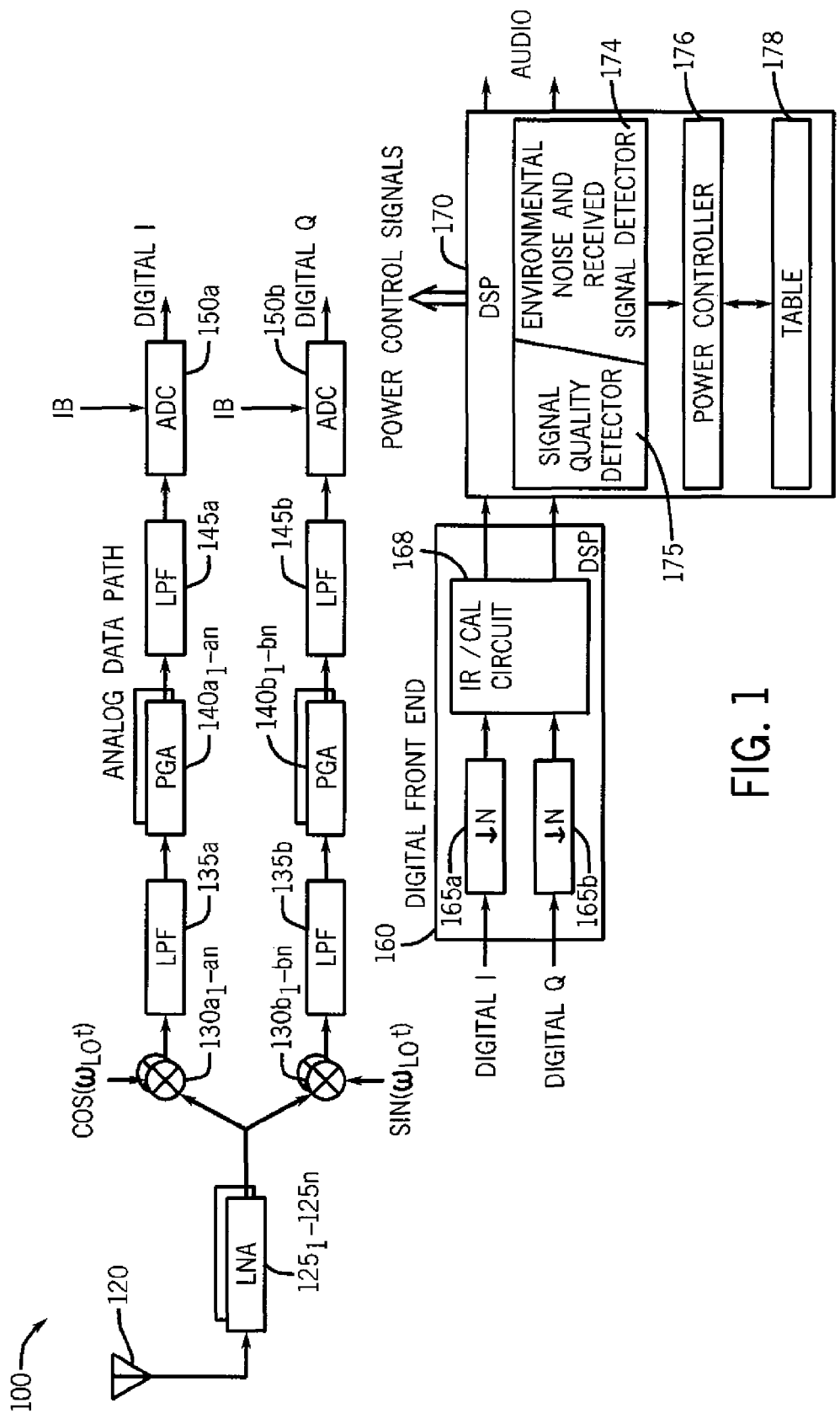
FIG. 1 is a block diagram of a receiver in accordance with an embodiment of the present invention.

Embodiments may perform power control in a radio receiver in various manners that take account of noise estimates, both receiver-based and environmental-based, as well as possibly signal quality metrics. The different manners can be enacted depending on a type of modulation operation, e.g., different measures can be used for analog and digital modulation.

Although the embodiments described herein are with regard to a radio receiver, understand the scope of the present invention is not limited in this regard, and techniques described herein can be used for any communications system, either analog or digital, and wired or wireless. Accordingly, embodiments may be applied beyond radio receivers to other types of receivers and transceivers, as well as various systems such as computer systems and mobile communication devices such as cellular phones, e.g., smart phones, implementing different communication protocols.

In general, power consumption may be controlled based on various metrics, depending on the communication system. In the embodiments described herein two different types of metrics, namely a SNR metric and an environmental noise metric are used. And the metric used may depend on whether during a given type of operation it is desired that an SNR exceeds a given threshold level, or whether a maximum SNR is desired. Typically, in a digital communication system, it is sufficient that an SNR exceeds a threshold level. In contrast, for analog communication systems, generally a maximum SNR is sought, although an SNR exceeding a threshold level may be sufficient for a moderate performance analog system.

As one example, power consumption can be controlled based at least in part on an estimate of the environmental noise present in an environment in which the receiver is located. As embodiments may perform power control based on this noise information, a receiver can operate at a lower power consumption level for much of its active time, since a receiver typically operates in an environment having a relatively high level of environmental noise (and particularly as compared to a laboratory environment that is shielded from environmental noise and in which receiver testing is performed). Thus embodiments may enable a receiver to be configured to operate in a low power mode for a majority of environmental levels. For example, in weak signal conditions power consumption may be able to be reduced without impacting the quality of the received signal. That is, for a weak signal in high environmental noise locations, receiver-generated noise is insignificant compared to the environmental noise level. Note that for a given circuit topology, the circuit's self-generated noise can be lowered by increasing power consumption (and area, e.g., in the form of parallel stages). Embodiments may leverage this principle to reduce power consumption when environmental noise exceeds this self-generated noise. In such conditions, consuming extra power in various receiver components (such as analog front end components) to reduce the receiver's noise profile does not benefit quality of the received signal, and simply consumes excess power.

Embodiments thus detect the level of the environmental noise and when it is determined that the level is high (e.g., above a given threshold), the receiver's power consumption can be throttled back with no impact on the received signal quality. The environmental noise may be from various sources including galactic radiation due to radiation of the Milky Way in the radio band, ionospheric noise, Northern lights and so forth. Typical field strength measurements in many environments, both urban and rural, indicate that a noise floor on the order of approximately 14 dB above an expected noise level of a 50 ohm resistor (the standard noise level in a laboratory environment as used for receiver specification testing) exists.

Embodiments may determine noise levels and signal metrics in a digital signal processor (DSP) of the receiver. For example, the environmental noise level can be determined by analyzing a trajectory of the received signal on an IQ plane. In an FM band of operation, environmental noise may be determined based on a variation of the signal amplitude from an average radius of an IQ circle, such that for FM band, the noise metric may correspond to the jitter around that average radius. Instead, for AM band the jitter in phase can be used to determine environmental noise. In yet another implementation, e.g., for a digital radio mode an analog FM carrier signal can be analyzed for noise information (e.g., amplitude variation as discussed above), since the digital information is transmitted as a sub-carrier to an analog FM carrier.

Embodiments may be implemented in many different types of systems. For example, noise-keyed automatic power control in accordance with an embodiment of the present invention can be incorporated into various types of radios such as a standalone AM/FM receiver or a multi-band receiver, such as an FM/AM/WB receiver. Referring now to FIG. 1, shown is a block diagram of a receiver in accordance with an embodiment of the present invention. As shown in FIG. 1, receiver 100 may be of a low-IF receiver architecture. In the embodiment of FIG. 1, receiver 100 is coupled to receive an RF signal via an antenna 120 that in turn is coupled to a low noise amplifier (LNA) 125. As seen, LNA may be formed of a plurality of parallel paths or stages $125_{1-n}$. As described below, depending on environmental noise level (or for other reasons) some or all of the parallel paths can be enabled, e.g., via control signals that switch such stages into or out of the signal path. In turn, the RF signal may be provided to mixers $130_{a1-an}$, and $130_{b1-bn}$ (generically mixers 130). As seen in FIG. 1, the receiver may have a complex signal architecture having separate IQ phases, such that separate paths for I and Q-phases are provided. This is realized by mixers 130, each of which mix the received RF signal with a local oscillator (LO) frequency at different phases, namely 90° apart. In the embodiment of FIG. 1, mixers 130 may mix the incoming signal with a local oscillator frequency to generate an IF signal, and as seen mixers 130 may also be formed of a plurality of parallel stages $130_{a1-an}$ and $130_{b1-bn}$.

Various analog processing may then be performed on the IF signals. Specifically, each of the I and Q paths may include a first low pass filter (LPF) 135a and 135b, a programmable gain amplifier (PGA) 140 formed of parallel stages 140a1-an and 140b1-bn and a second LPF 145a and 145b. In one embodiment, the bandwidth of these filters may be selected based on whether a valid digital signal for a desired channel has been detected. In some embodiments, one or more of the filters also may be parallelized. The resulting signal is then provided to an ADC 150a and 150b that can be powered by a variable bias current (IB), in some embodiments, and which converts the analog IF signals to digital I and Q signals. These signals may then be provided to a digital portion of the receiver. Note that while in many implementations receiver 100 may be configured as a single integrated circuit, e.g., a CMOS device configured on a single semiconductor die, the scope of the present invention is not limited in this regard.

The digital information may be provided to a digital portion of the receiver which may include a digital front end 160 to perform various digital processing to prepare the signals for demodulation in a DSP 170, which may thus demodulate the signals and provide demodulated data to a desired location. As seen in FIG. 1, digital front end 160 may include programmable decimators 165 to control a sampling rate of the digital signals. Note that the programmable decimation ratio N can be controlled to handle various sampling rates, e.g., digital radio (744 kilosamples per second (KS/s)), FM (372 KS/s), WBRX (93 KS/s), or AM (46 KS/s).

While shown as a single structure, understand that in some implementations a portion of such decimation may be performed in fixed digital hardware, while additional decimation may be performed using programmable logic or in a DSP firmware. In addition, in the embodiment shown in FIG. 1 front end 160 may further include an image rejection/calibration circuit 168 to handle image rejection processing and to generate samples at a desired rate, and to thereafter provide digital samples to DSP 170 where demodulation and other processing can be performed to obtain digital audio signals that can be converted to an analog audio output signal to be provided to an output mechanism (not shown in FIG. 1).

With regard to the power control implemented using an embodiment of the present invention as further seen in FIG. 1, DSP 170 may include certain detectors and controllers to analyze various receiver information and determine an appropriate power level based on that information. Specifically in the embodiment of FIG. 1, DSP 170 may include an environmental noise and received signal detector 174 which, as will be discussed further below can determine a level of environmental noise present in a location in which the receiver is being operated as well as a received signal metric. In addition, DSP 170 may include a power controller 176 which may receive the environmental noise level from environmental noise and received signal detector 174 and a measure of receiver-generated noise, which can be obtained from a table 178 (also coupled to the power controller). As further seen in FIG. 1, DSP 170 may further include a signal quality detector 175, which may generate a signal quality metric, such as an SNR measure. Based at least in part on this information, the power controller can determine an appropriate power level at which to operate the receiver.

Accordingly, DSP 170 may output power control signals, which can be sent to various analog front end components to control them. Such control may include enabling/disabling of parallel stages of various components, as well as controlling, for example, bias currents or voltages supplied to given components. For example, the parallel stages can be controlled by MOSFETs or other switches, to thus switch in or out stages based on the control signals. While shown with this particular implementation in the embodiment of FIG. 1, the scope of the present invention is not limited in this regard. The DSP may include or be associated with, in some embodiments, an article in the form of a non-transitory computer-readable storage medium onto which instructions are written. These instructions may enable the DSP, including the power controller, environmental noise detector, signal quality detector, or other programmable processor, to perform power control, noise detection, quality analysis, and other processing as described herein.

Figure 2:
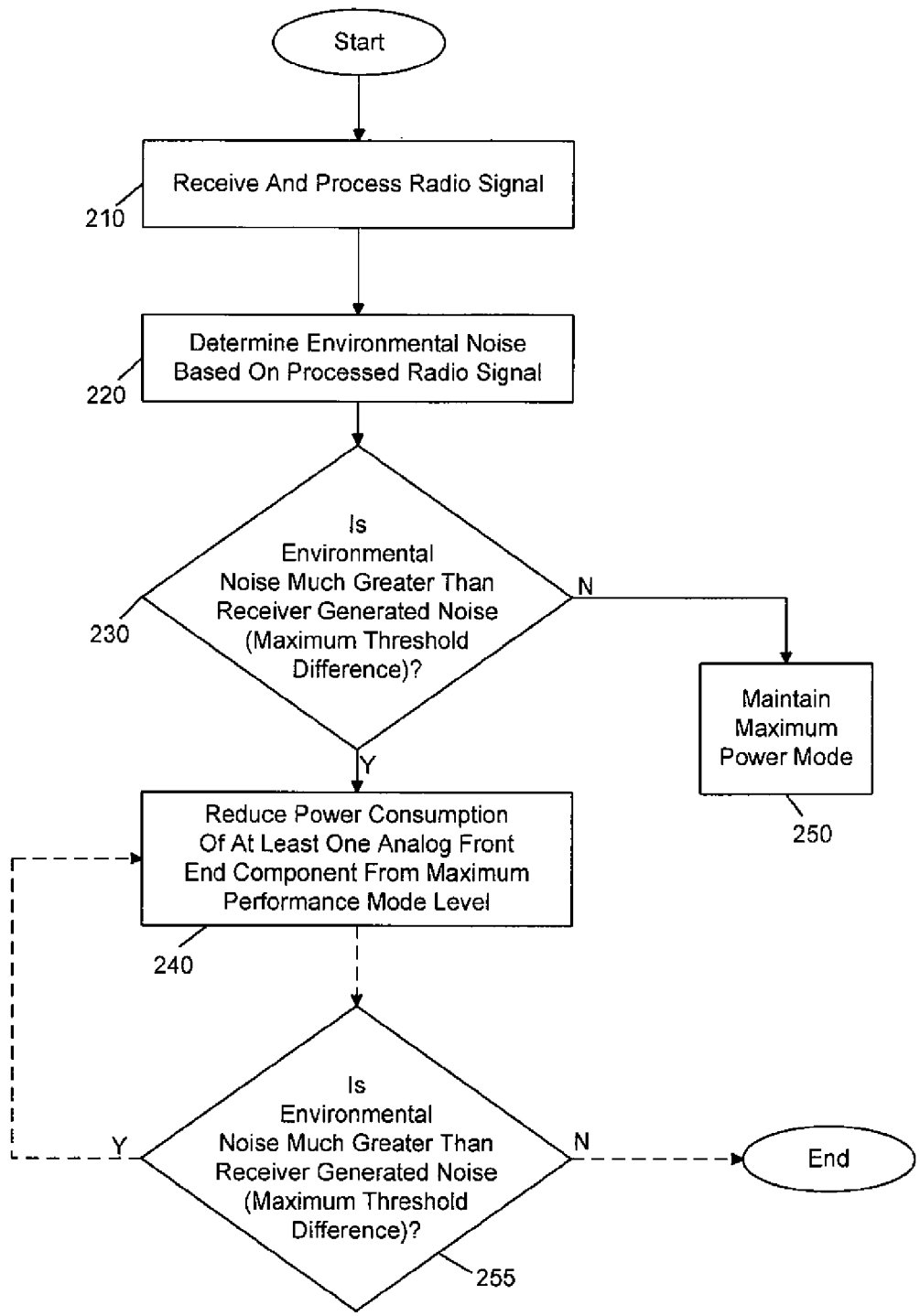
FIG. 2 is a flow diagram of a power control method in accordance with an embodiment of the present invention.

Referring now to FIG. 2, shown is a flow diagram of a power control method in accordance with an embodiment of the present invention. As shown in FIG. 2, method 200 may be performed within a radio receiver, e.g., the power controller of FIG. 1, and can be used to enable reduced power consumption in the presence of high amounts of environmental noise. That is, when it is determined that there is at least a given level of environmental noise at a location in which the radio receiver is located, various analog front end components can be controlled to reduce their power consumption since the increased power consumption for performing radio processing with reduced noise does not enable substantially greater performance of the receiver. Note that the discussion with reference to FIG. 2 (and the following FIG. 3) is generic with regard to a type of modulation with which the receiver is operating. As will be discussed below, different metrics and different analyses can be performed depending on whether the received signal is of an analog or digital modulation. That is, for operation in an analog modulation, a signal quality metric, e.g., SNR may be maximized to the extent possible, by taking into account power consumption. In contrast, for digital modulation, e.g., digital audio broadcast (DAB) band, all that is needed for suitable operation is a threshold signal quality level such that an appropriate bit error rate (BER) can be obtained.

In many embodiments, the method of FIG. 2 may be initiated soon after powering on a receiver of a system. A receiver can be configured to initially operate at a maximum power level. As an example, a receiver may be configured to begin operation in a maximum power mode, but quickly enter a low power mode, e.g., within 100 milliseconds of beginning operation, by performing the method of FIG. 2, and based on the determined environmental noise. As seen in FIG. 2, method 200 may begin by receiving and processing a radio signal (block 210). In general, a receiver as shown in FIG. 1 may be configured to receive an RF signal including a desired radio channel, downconvert and process the RF signal and generate a digitized version of the signal, which can then be provided to digital processing circuitry such as a DSP to demodulate the signal, further process it and provide an audio output.

During this receipt and processing of the radio signal a level of environmental noise can be determined (block 220). For example, depending on the type of radio signal, e.g., bands such as AM, FM or a digital band, the amount of environmental noise can be determined by analyzing various metrics such as available from different detectors within the receiver signal processing chain. As one example, a noise detector can estimate the total noise of the signal provided to the DSP, which includes both environmental noise and receiver-generated noise.

In one embodiment, the noise at the input of the DSP, e.g., as determined by a SNR metric of the chip generated by one or more detectors in the analog front end, can be calculated. Then this noise metric can be input referred to an input of the receiver. For example, an effective noise spectral density at the input of the receiver, e.g., in terms of nanovolts per root Hertz ($nV/\sqrt{Hz}$), can be calculated. In one embodiment, this input-referred environmental noise can be determined using a knowledge of a gain of the receiver from its input to the DSP engine, along with the computed noise metric. More specifically, to obtain the input-referred noise, the computed noise metric can be divided by the gain of the receiver from its input to the DSP. Note that this input-referenced noise level includes both the actual environmental noise as well as the receiver-generated noise. To extract the environmental noise from the total noise, a knowledge of the expected receiver-generated noise for the operation mode of the receiver can be obtained, e.g., from a table such as table 178 shown in FIG. 1. Then a difference between the input-referred noise level and this receiver-generated noise level can be determined to thus obtain an estimate of the environmental noise level.

Although this noise measure can be provided to a power control logic which can be implemented in the DSP (as shown in FIG. 1), embodiments are not limited in this regard and instead in other implementations, the noise information can be provided to another source, e.g., an on-chip microcontroller such as a microcontroller unit (MCU) of the radio or an off-chip source to perform the analysis.

Still referring to FIG. 2, it can be determined at diamond 230 whether the environmental noise is much greater than the receiver-generated noise. In other words, it can be determined whether at least a maximum threshold difference exists between the environmental noise and the receiver-generated noise. In one embodiment, this determination can be based in part on the receiver noise table, which can be stored within the receiver. This table can include noise levels of the receiver for various power consumption levels at which the receiver may operate. This table can be generated based on receiver characterization, which can be performed during design operations and hard coded into the table. Or such information can be determined during manufacturing testing and burned into the chip. Still further in some embodiments, this table can be dynamically generated based on testing done during actual operation of the receiver. In general, the table may include multiple entries each corresponding a power consumption level (which as discussed below can correspond to a given amount and type of enabled front end stages) and the receiver-generated noise for the component, e.g., as its input-referred noise level at the given power consumption level. Thus embodiments may provide receiver-generated noise information for each front end block. In addition, in some embodiments multiple noise levels can be provided for each block based on the power consumption level (e.g., enabled stages, gain level and so forth) at which the receiver is operating. Thus the table may include one or more entries for each front end block to store a value of the input referred noise for the block. And the controller may determine a total receiver-generated noise based on the current control of each front end block (e.g., for each available control level for the front end block). Although described as a table-based mechanism, other embodiments may determine receiver-generated noise dynamically using various detection mechanisms of the receiver.

Still referring to diamond 230, the determination is thus made based on whether the measured environmental noise is much greater than receiver-generated noise. If the input referred noise as determined at an input to the DSP is much larger than the receiver's self-generated noise (e.g., based on reference to the receiver noise level obtained from a table), then the noise is dominated by environmental noise, and accordingly power consumption can be reduced. Although the scope of the present invention is not limited in this regard, the determination at diamond 230 can be in the affirmative if the environmental noise power is at least 6 dB greater than the receiver-generated noise power. For example, in one embodiment the environmental noise power may be considered to be much greater than the receiver-generated noise power when it is at least four times greater than the receiver noise power. If so, control passes to block 240 where the power consumption of at least one analog front end component can be reduced from a maximum performance mode level. As one example, assume that the environmental noise is estimated at 10 nV/√Hz, and the receiver-generated noise is at 1 nV/√Hz, power consumption can be throttled. As a result, the receiver-generated noise power increases, e.g., four times to 2 nV/√Hz. However, by increasing the receiver-generated noise, the total noise barely changes, e.g., from 10.0 to 10.1 nV/√Hz because noise adds in a RMS sense.

In this way, power consumption can be reduced, e.g., by 5-10% of total power consumption, in virtually all operating environments. Thus, given that the environmental noise is relatively high in the receiver's location, the additional power consumed by one or more analog front end components to try to operate the receiver at a relatively low noise level would not substantially improve received signal quality due to the high environmental noise level.

In some embodiments, a single update to the analog front end control can be effected to reduce the power consumption. However, in other embodiments to avoid overshooting of the power reduction operation in a manner that could affect signal quality, a generally iterative process can be performed to adjust the analog front end in a plurality of steps and check at each step whether the environmental noise metric still is still greater than the maximum threshold difference, and when it is not, to stop further updates to the analog front end control. Thus as seen in FIG. 2 (in dashed lines) after reducing the power consumption by updating the control of at least one analog front end component, control passes to diamond 255, where it can again be determined whether the environmental noise is much greater than the receiver-generated noise, e.g., by at least a maximum threshold difference. As seen, control passes back to block 240 for further power consumption reduction by analog front end control if the environmental noise is still much greater than the receiver-generated noise. When it is not, the method of FIG. 2 may conclude.

Various manners of reducing the power consumption of the front end can occur. For example, one or more parallel stages of one or more front end components can be disabled to reduce power consumption. Thus in a high noise environment, instead of enabling additional signal processing (e.g., by way of parallel stages or stripes) to improve noise performance of the receiver, embodiments disable such stripes to reduce power consumption. As examples and not for purposes of limitation, embodiments may configure various front end components to be controllable to reduce power consumption, including a LNA, mixer, PGA and an analog-to-digital converter (ADC), e.g., as shown in FIG. 1 above. Power consumption in the ADC may be controlled by providing a variable bias current to control the ADC. Or in the ADC or other front end blocks, supply voltages from a variable power supply may be controlled to reduce power consumption, in addition to or instead of control of a varying number of parallel stages.

Note that although only a single threshold is shown for ease of illustration in FIG. 2, understand that the scope of the present invention is not so limited and in other embodiments there can be multiple thresholds. For example, assume that at an environmental noise level of 10 nV/√Hz, a receiver-generated noise may be allowed to increase from a level of approximately 1 nV/√Hz in a maximum power mode to a level of at least double the noise in a lower power mode. Then if the environmental noise increases, e.g., to 15 or 20 nV/√Hz, the receiver-generated noise may be permitted to quadruple, without an effect on performance.

As further seen in FIG. 2, if instead it is determined (at diamond 230) that the environmental noise is not much greater than the receiver-generated noise (e.g., the environmental noise is within 3 dB of the receiver-generated noise), this means that the additional power consumption by the front end components to operate the receiver with relatively low noise would substantially improve received signal quality. Accordingly, at block 250 the maximum performance mode may be maintained. As such, the various front end components can be operated at full power, e.g., by enabling all parallel stages of the one or more front end components. Although shown with this particular implementation in the embodiment of FIG. 2, understand the scope of the present invention is not limited in this regard. While different signal quality metrics are possible, in some embodiments these metrics may include a SNR, a received signal strength indication (RSSI) or other such signal quality metrics, e.g., a bit error rate (BER), or so forth. As examples, for RSSI, signal power over some bandwidth can be used as a metric (e.g., desired signal RSSI, blocker RSSI, a ratio, or wideband RSSI). In other embodiments, automatic gain control (AGC) circuit state may be used as a metric such that power can be reduced if the AGC circuit is not engaged.

Embodiments may also provide a level of hysteresis so that entry into a power reduced mode does not occur until the environmental noise far exceeds the receiver's self-generated noise, and power consumption can be increased when the environmental noise starts to approach the receiver-generated noise. For discussion purposes, and continuing with the example of FIG. 2 assume that the power throttling performed in the example of FIG. 2 causes the receiver-generated noise to increase to, e.g., 2 nV/√Hz. Then if the detected noise (environmental or total noise level) at the DSP begins to reduce, e.g., to approximately 6 nV/√Hz, power consumption may be increased as the receiver noise may begin to have a performance impact at that level. In the above example, with the environmental noise at 6 nV/√Hz and the receiver noise at 2 nV/√Hz, then it can be determined that the environmental noise is closer to the receiver-generated noise level and power consumption should be increased. In some embodiments, in addition to hysteresis provided by different thresholds for entry into and exit from a low power state, embodiments may further provide a time-dependent hysteresis such as a hold-off period to prevent the receiver from switching back and forth rapidly, thus avoiding glitches. Various user-controlled parameters may be provide to enable a user (e.g., an OEM that incorporates the receiver into the system or even an end user) to tune such parameters.

Figure 3:
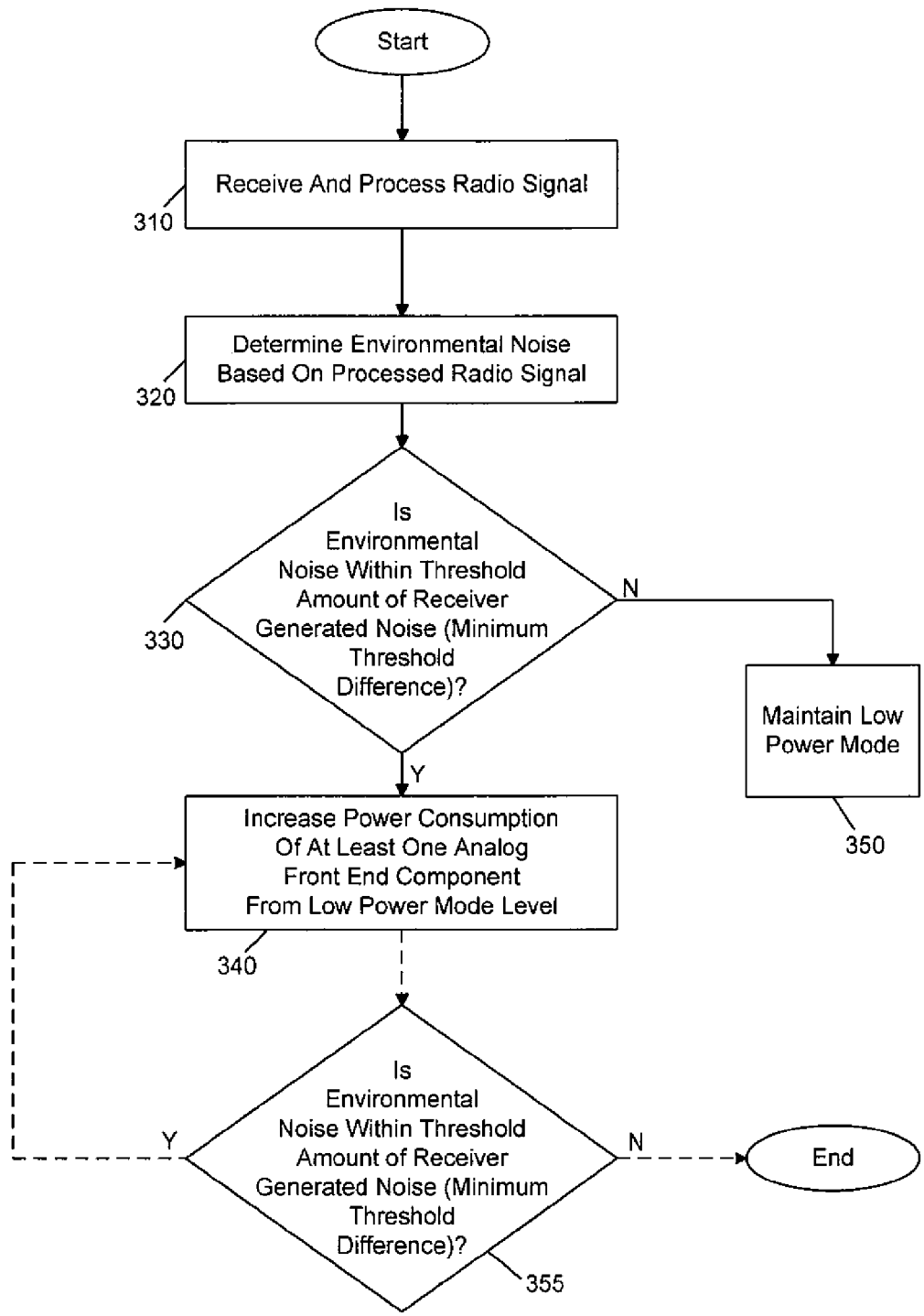
FIG. 3 is a flow diagram of a power control method while in a low power mode in accordance with an embodiment of the present invention.

Referring now to FIG. 3, shown is a flow diagram of a power control method for power control analysis in accordance with an embodiment of the present invention (that can be performed while in a low power mode). As shown in FIG. 3, method 300 may similarly be performed by the power controller of the receiver, and can be used to increase power consumption when the level of environmental noise becomes closer to the receiver-generated noise. Method 300 may begin by receiving and processing a radio signal (block 310). During this receipt and processing of the radio signal, the environmental noise level can be determined (block 320), as discussed above in block 220 of FIG. 2.

Then it can be determined at diamond 330 whether the environmental noise is within a threshold amount of the receiver-generated noise (namely less than a minimum threshold difference exists between the environmental noise level and the receiver-generated noise). In one embodiment, this determination can be based on the computed environmental noise level (e.g., as determined by the receiver input-referred environmental noise level) and information from the receiver noise table discussed above. Although the scope of the present invention is not limited in this regard, the threshold amount may correspond to a predetermined percentage with respect to the receiver-generated noise. For example in one embodiment, it can be determined that the environmental noise is within a threshold amount of the receiver-generated noise if it is less than 6 dB of the receiver-generated noise. Thus this different determination in FIG. 3 as compared to the determination in FIG. 2 provides a level of hysteresis such that after entry into a power reduced mode of operation, there is (likely) not an immediate switching back to a maximum power mode.

If it is determined in diamond 330 that the environmental noise is within the threshold amount of the receiver-generated noise, control passes to block 340 where the power consumption of at least one analog front end component can be increased from its current (e.g., low power mode) level. If not, control passes to block 350, where the current low power mode can be maintained. As with FIG. 2, an iterative check and update process can be performed via blocks 340 and 355.

Figure 4:
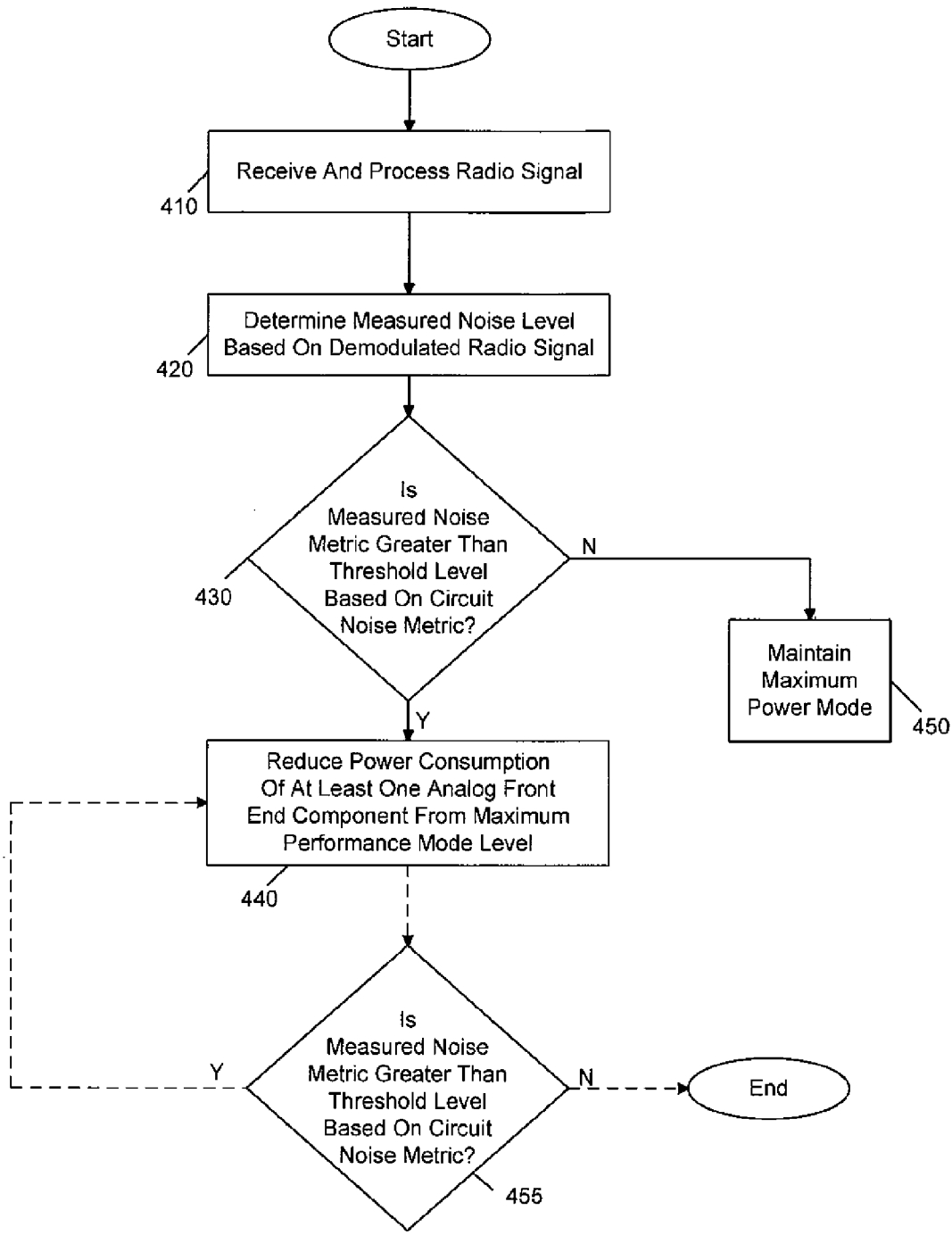
FIG. 4 is a flow diagram of a power control method for an analog signal in accordance with one embodiment of the present invention.

As discussed above, depending on the type of modulation different manners of performing power control can be realized. Referring now to FIG. 4, shown is a flow diagram of a power control method for an analog modulated signal such as an FM band. In general, for an analog modulated signal, a higher fidelity output can be achieved by realizing a higher signal quality within the receiver processing path. In other words, an increase in a signal quality metric, e.g., SNR, corresponds to an improved fidelity. Accordingly, for such analog signals power consumption control can be enabled when an environmental noise level is greater than a threshold noise level. More specifically, as seen in FIG. 4, method 400 may begin by receiving and processing a radio signal (block 410). From a demodulated radio signal, a measured noise level can be determined (block 420). This measured noise level may be, as discussed above an environmental noise level as determined by extracting receiver-generated noise level, e.g., corresponding to a circuit's noise floor for a given level of operation from the determined noise level at which the receiver is operating. Control then passes to diamond 430 where it can be determined whether this measured noise level is greater than a threshold level. More particularly, this threshold level can be based on the circuit noise metric for the current operation of the receiver. In other words, if the environmental noise is at least a threshold level more than the circuit noise, e.g., at least a 6 dB difference between environmental noise and receiver noise (namely the environmental noise is at least three dB higher than the receiver noise), control passes to block 440 where power consumption can be reduced, as generally discussed above. Otherwise, the maximum power mode may be maintained at block 450. In an implementation in which an iterative process is performed, as discussed above with regard to FIG. 2, control can pass to diamond 455 for a re-check as to whether after the analog front end update the measured noise level is still greater than this threshold level above the receiver-generated noise, at which point an iterative control update can occur. Although shown with this particular implementation in the embodiment of FIG. 4, understand the scope of the present invention is not limited in this regard.

Figure 5:
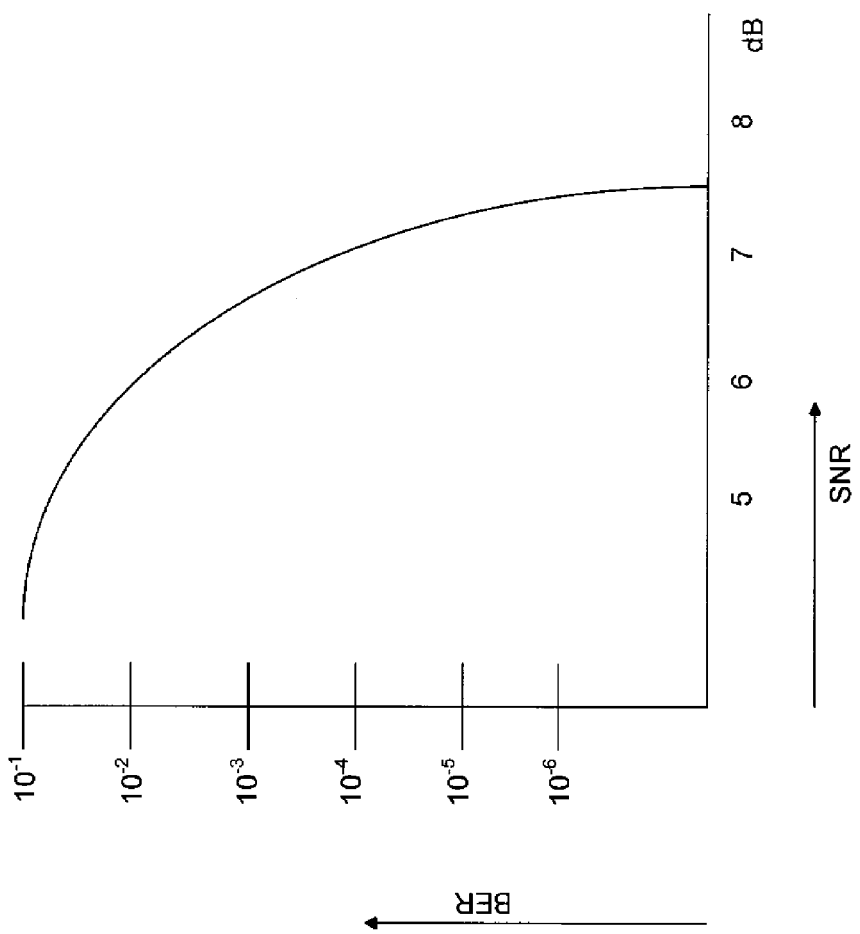
FIG. 5 is a graphical illustration of bit error rate versus signal-to-noise ratio in accordance with one embodiment of the present invention.

Instead for a digitally modulated signal, rather than seeking to maximize signal quality, all that is needed is a signal quality level that affords an appropriate bit error rate. Referring now to FIG. 5, shown is a graphical illustration of BER versus SNR for a representative digital system such as a DAB system. As seen, to obtain a suitable bit error rate, only a threshold SNR level is needed to be achieved. Any increase in SNR above this level has virtually no impact on improving bit error rate. As such, embodiments may leverage this fact to operate at a lower power consumption level.

Figure 6:
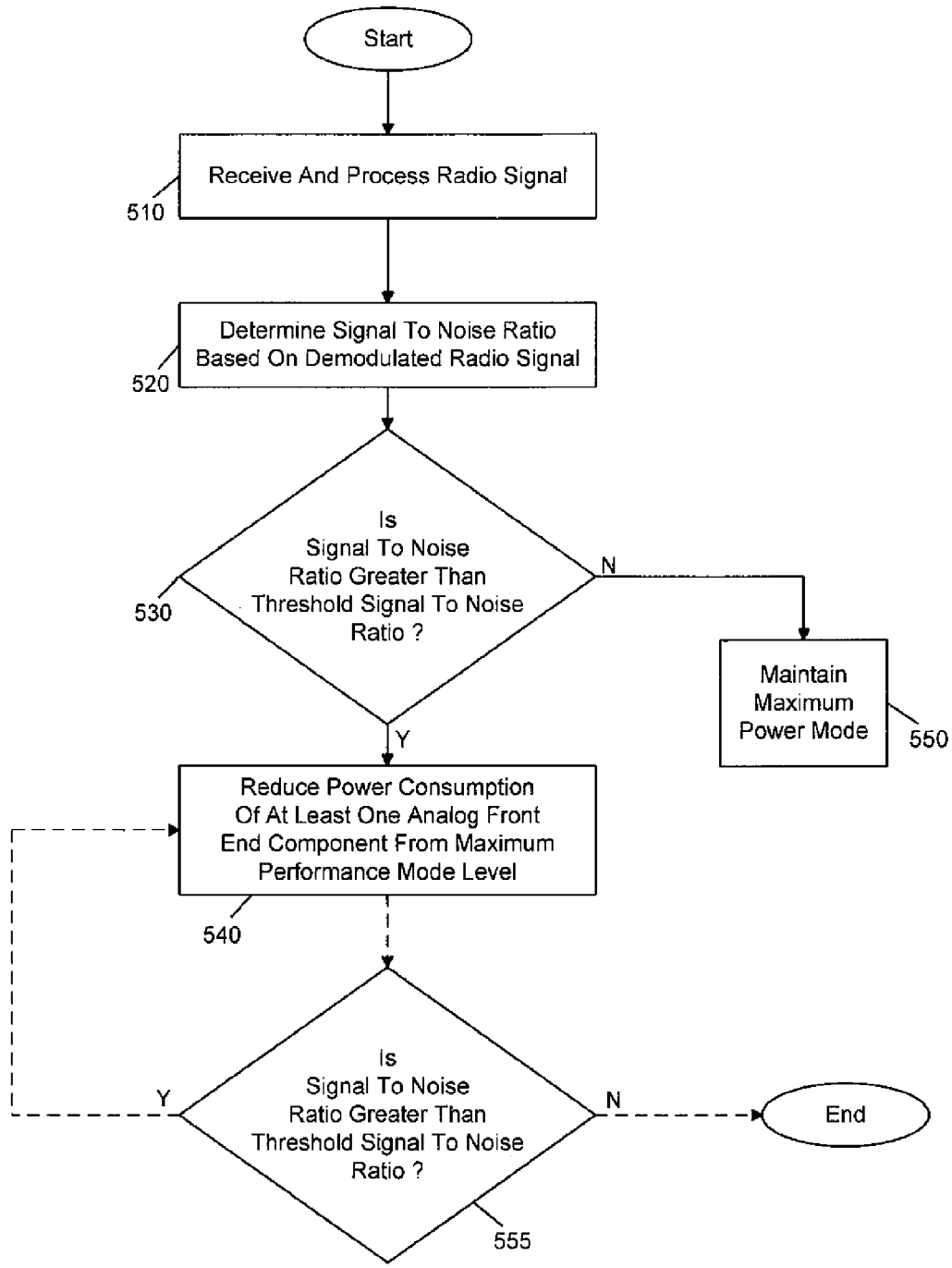
FIG. 6 is a flow diagram of a power control method in a digital signal in accordance with one embodiment of the present invention.

Referring now to FIG. 6, shown is a flow diagram of a method for performing power control for a digital signal. As seen in FIG. 6, method 500 may begin by receiving and processing a radio signal (block 510). Then at block 520 a SNR can be determined based on the demodulated radio signal. It can then be determined whether this SNR is greater than a threshold SNR level. This threshold SNR level may correspond to a level at which a suitable BER is achieved. For example, with reference back to FIG. 5, the SNR threshold level may be at a level where a BER of approximately $1 \times 10^{\times 5}$ is achieved. In one representative implementation, this BER can be obtained at a threshold SNR level of 7 dB. Accordingly, if the SNR that is determined is greater than this threshold level, control passes to block 540. In other words, if there is sufficient SNR headroom, control passes to block 540 where power consumption can be reduced, as generally discussed above. Otherwise, the maximum power mode may be maintained at block 550. In an implementation in which an iterative process is performed, as discussed above with regard to FIG. 2, control can pass to diamond 555 for a recheck as to whether after the analog front end control the SNR is still greater than this threshold SNR level. Although shown with this particular implementation in the embodiment of FIG. 6, understand the scope of the present invention is not limited in this regard.

Thus depending on a given modulation scheme, different manners of determining environmental noise are possible. In general, noise can be determined using digitized signals such as IQ data obtained from an analog front end of the receiver.

Such information can be processed to determine deviations, e.g., in amplitude or phase, depending on a particular modulation scheme to determine an environmental noise level.

Figure 7:
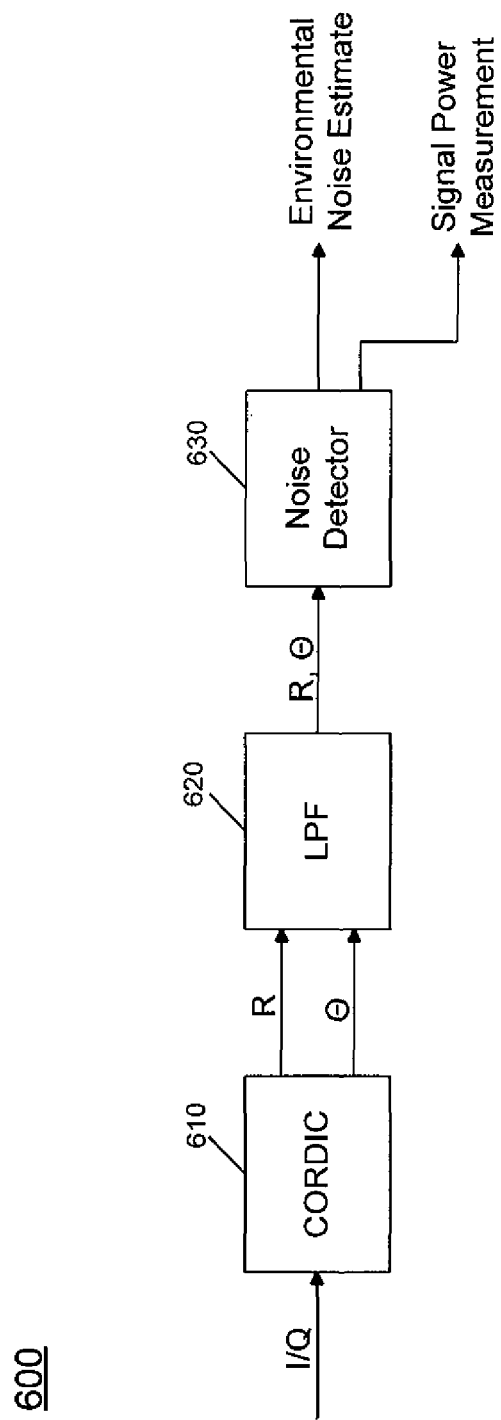
FIG. 7 is a block diagram of circuitry used for determining environmental noise in accordance with an embodiment of the present invention.

Referring now to FIG. 7, shown is a block diagram of circuitry used for determining environmental noise in accordance with an embodiment of the present invention. Specifically, circuitry 600 may be included within a DSP and can be used to determine an estimate of the environmental noise. As seen, incoming IQ data can be provided to a coordinate rotation digital computer (CORDIC) engine, which can be implemented as coprocessor circuitry or by software/firmware executing on the DSP. Incoming IQ data can be processed in the CORDIC engine 610 to obtain polar information, namely an amplitude, R, and a phase, Θ. Such information can be provided to a filtering function, e.g., a low pass filter 620, which thus smoothes the output of the CORDIC engine by filtering these values. In turn, the amplitude and phase information can be provided to a noise detector 630 which may generate an environmental noise estimate based on the information. Depending on the type of modulation, different analyses can be performed. For example, as discussed above for FM band, variation in the amplitude using the filtered value of R can be used to estimate the environmental noise, while for AM band variation in the phase using the filtered value of Θ can be used to estimate environmental noise. Instead for a digital mode of operation, different operations may be possible depending on the type of digital modulation scheme.

Note that the output of noise detector 630 may be an environmental noise estimate. This estimate may not be input-referred. Instead to obtain an input-referred noise estimate, an embodiment may, either in the noise detector or in the power controller, divide this noise estimate by the gain of the front end of the receiver to thus determine the input-referred environmental noise level. The output of noise detector 630 may be provided to, e.g., a power controller such as discussed above with regard to FIG. 1. And in addition, noise detector 630 may further generate a signal power measurement.

Figure 8:
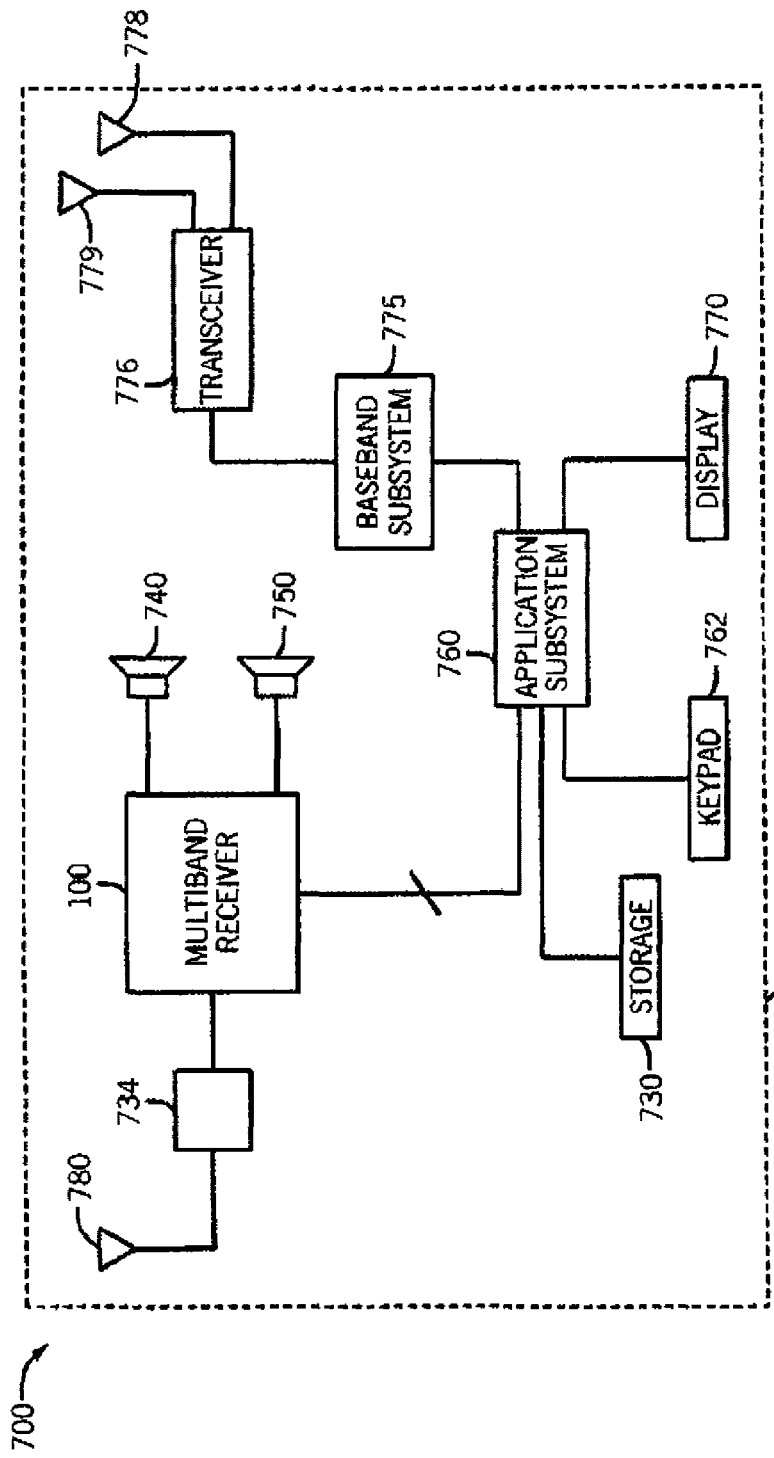
FIG. 8 is a block diagram of a system in accordance with an embodiment of the present invention.

Referring to FIG. 8, in accordance with some embodiments of the invention, a multiband receiver 100, which may include power control circuitry in accordance with an embodiment, may be part of a multimedia portable wireless device 710, which in turn is part of a wireless system 700. As examples, the wireless device 710 may be a multi-function, multi-band radio, cellular telephone, smart phone, PDA, tablet computer, mobile game device, or so forth and may play music or book downloads, and may be part of a wireless link between a satellite antenna and a radio receiver, a terrestrial receiver, etc.

Among its other various functions, the wireless device 710 may store digital content on a storage 730, which may be a flash memory or hard disk drive, as a few examples. The wireless device 710 generally includes an application subsystem 760 that may, for example, receive input from a keypad 762 of the wireless device 710 (which may be a touch pad, e.g., of a display 770) and display information on display 770. Furthermore, the application subsystem 760 may generally control the retrieval and storage of content from the storage 730 and the communication of, e.g., audio from receiver 100. As shown, receiver 100 may be directly connected to speakers 740 and 750 for output of audio data (understand that in some embodiments a separate audio processor may be integrated between the receiver and speakers). As depicted in FIG. 8, the multimode receiver 100 may be coupled by a matching network 734 to a receiver antenna 780.

In accordance with some embodiments of the invention, the wireless device 710 may have the ability to communicate over a communications network, such as a wide area, local area, or personal wireless network. For these embodiments, the wireless device 710 may include a baseband subsystem 775 that is coupled to the application subsystem 760 for purposes of encoding and decoding signals for this wireless network. Baseband subsystem 775 may be coupled to a transceiver 776 that is connected to corresponding transmit and receive antennas 778 and 779.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving and processing an incoming radio frequency (RF) signal in a receiver;
determining an environmental noise level based on the processed RF signal corresponding to environmental noise present in an environment in which the receiver is located;
obtaining receiver-generated noise from a table in the receiver, wherein the table includes a plurality of entries each associating a power consumption level of the receiver with a receiver-generated noise level; and
if the environmental noise level is substantially greater than the receiver-generated noise, reducing power consumption of at least one analog front end component of the receiver.

2. The method of claim 1, wherein reducing the power consumption comprises disabling at least one of a plurality of parallel stages of a first front end component of the receiver.

3. The method of claim 2, wherein reducing the power consumption comprises disabling at least one of a plurality of parallel stages of a second front end component of the receiver.

4. The method of claim 3, wherein the first front end component comprises an amplifier and the second front end component comprises a mixer.

5. The method of claim 1, further comprising reducing the power consumption if the environmental noise power level is at least a factor times the receiver-generated noise power.

6. The method of claim 5, further comprising thereafter if the environmental noise level is within a threshold amount of the receiver-generated noise, increasing power consumption of the at least one front end component of the receiver.

7. The method of claim 1, further comprising maintaining a maximum power mode of the receiver if the environmental noise level is not substantially greater than the receiver-generated noise.

8. The method of claim 7, wherein in the maximum power mode, each of a plurality of front end components of the receiver has all of multiple parallel stages enabled.

9. The method of claim 1, wherein the receiver-generated noise levels are stored in the table during fabrication of the receiver.

10. The method of claim 1, further comprising configuring the receiver to operate in a reduced power consumption mode for a majority of environmental conditions.

11. The method of claim 1, further comprising operating the receiver at a first power consumption level in a laboratory environment and operating the receiver at a second power consumption level in a non-laboratory environment, the second power consumption level lower than the first power consumption level.

12. An apparatus comprising:
a receiver having an analog front end including a signal path to receive and downconvert a radio frequency (RF) signal to a second frequency signal, the analog front end including:
a low noise amplifier (LNA) having a first plurality of parallel paths to receive and amplify the RF signal;
a mixer coupled to the LNA to downconvert the RF signal to the second frequency signal, the mixer having a second plurality of parallel paths;
a demodulator coupled to the analog front end to receive the second frequency signal and to demodulate the second frequency signal; and
a controller to control a power consumption level of the receiver based at least in part on an environmental noise level of an environment in which the receiver is located.

13. The apparatus of claim 12, further comprising a noise estimator coupled to the signal path to estimate the environmental noise level based on the RF signal.

14. The apparatus of claim 13, wherein the noise estimator includes a coordinate rotation digital computer (CORDIC) engine to calculate a magnitude and a phase from the second frequency signal and to generate the environmental noise level based on a variation in at least one of the magnitude and the phase.

15. The apparatus of claim 14, wherein the controller is to estimate an input-referred environmental noise level based on the environmental noise level and a gain of the analog front end, and to compare the estimated input-referred environmental noise level to a receiver-generated noise level obtained from a table stored in the receiver.

16. The apparatus of claim 12, wherein the controller is to reduce the power consumption level of at least one of the LNA and the mixer from a maximum power mode level if the environmental noise level is substantially greater than receiver-generated noise at the maximum power mode level.

17. The apparatus of claim 16, wherein the controller is to increase the power consumption level of at least one of the LNA and the mixer if the environmental noise level is thereafter within a threshold amount of the receiver-generated noise.

18. The apparatus of claim 16, wherein the controller is to determine the environmental noise level based on amplitude jitter present in the second frequency signal in an FM mode and to estimate the environmental noise level based on phase jitter present in the second frequency signal in an AM mode.

19. The apparatus of claim 12, wherein the controller is to control the power consumption level further based on a received signal strength indication.

20. A system comprising:
a receiver having an analog front end including a signal path to receive and downconvert a radio frequency (RF) signal to a second frequency signal, the analog front end including:
an environmental noise detector to estimate an environmental noise level of an environment in which the receiver is located based on a first signal metric of the RF signal;
a table to store characterization data of the receiver, the characterization data including a receiver-generated noise level associated with each of a plurality of power levels at which the receiver can operate; and
a power controller to control a power consumption level of the receiver based on the environmental noise level and the receiver-generated noise level.

21. The system of claim 20, wherein the power controller is to send control signals to at least one component of the analog front end to disable at least one of a plurality of parallel stages of a first front end component of the receiver.

22. The system of claim 20, wherein the power controller is to enable the receiver to operate at a first power consumption level in a laboratory environment and at a second power consumption level in a non-laboratory environment, the second power consumption level lower than the first power consumption level.

23. The system of claim 20, further comprising a noise estimator coupled to the signal path to estimate the environmental noise level based on the RF signal, and including a coordinate rotation digital computer (CORDIC) engine to calculate a magnitude and a phase from the second frequency signal and to estimate the environmental noise level based on a variation in at least one of the magnitude and phase.

24. The system of claim 23, wherein the power controller is to estimate an input-referred environmental noise level based on the environmental noise level and a gain of the analog front end, and to compare the estimated input-referred environmental noise level to a receiver-generated noise level obtained from the table.

25. An article comprising a machine-accessible storage medium including instructions that when executed cause a system to:
receive and process a digital communication signal in the system;
determine a signal-to-noise ratio (SNR) based on the digital communication signal, and if the SNR is greater than a threshold level, reduce power consumption of at least one analog front end component of the system; and
determine an environmental noise level corresponding to environmental noise present in an environment in which the system is located, and if the environmental noise level is substantially greater than receiver-generated noise, reduce power consumption of the at least one analog front end component, wherein a desired channel is of an analog modulation.

26. The article of claim 25, wherein when the SNR is at least at the threshold level, at least a minimum desired bit error rate (BER) is obtained.

* * * * *